United States Patent
Hill et al.

(10) Patent No.: US 10,227,987 B2
(45) Date of Patent: Mar. 12, 2019

(54) VALVE ASSEMBLY INTEGRATED INTO A COOLANT PUMP AND METHOD FOR CONTROLLING THE SAME

(71) Applicant: BorgWarner Inc., Auburn Hills, MI (US)

(72) Inventors: Chris Andrew Hill, Clarkston, MI (US); Daniel Robert LeBlanc, Goodrich, MI (US); Christian Theodor Herrmann, Stuttgart (DE); Markus Josef Auer, Stuttgart (DE)

(73) Assignee: BorgWarner Emissions Systems LLC, Dixon, IL (US)

( * ) Notice: Subject to any disclaimer, the term of this patent is extended or adjusted under 35 U.S.C. 154(b) by 0 days.

(21) Appl. No.: 15/827,450

(22) Filed: Nov. 30, 2017

(65) Prior Publication Data

US 2018/0172009 A1   Jun. 21, 2018

Related U.S. Application Data

(60) Provisional application No. 62/435,360, filed on Dec. 16, 2016.

(51) Int. Cl.
*F04D 15/00* (2006.01)
*F01P 5/12* (2006.01)
(Continued)

(52) U.S. Cl.
CPC ............ *F04D 15/0022* (2013.01); *F01P 5/12* (2013.01); *F01P 7/162* (2013.01);
(Continued)

(58) Field of Classification Search
CPC ........... F01P 5/10; F01P 5/12; B60H 1/00885; F04D 1/00; F04D 13/14; F04D 19/002
See application file for complete search history.

(56) References Cited

U.S. PATENT DOCUMENTS 6,647,934 B2   11/2003   Marsh et al.
9,068,666 B2   6/2015    Roby
(Continued)

FOREIGN PATENT DOCUMENTS

DE   102009020186 A1   1/2011
EP   2840242 A1   2/2015

OTHER PUBLICATIONS

English language abstract for DE 10 2009 020 186 extracted from espacenet.com database on Dec. 18, 2017, 2 pages.

*Primary Examiner* — Long T Tran
(74) *Attorney, Agent, or Firm* — Howard & Howard Attorneys, PLLC

(57) ABSTRACT

A pump assembly is fluidly coupled to a vehicle engine for moving a fluid. The pump assembly includes a pump housing and an impeller disposed in the pump housing for moving the fluid in the pump housing towards an outlet. Additionally, the pump assembly includes a valve assembly integrated with the pump housing. The valve assembly includes a barrel disposed in the pump housing and having at least one inlet, wherein the at least one inlet is configured to provide controlled flow of the fluid into the pump housing. A sleeve is rotatably coupled to the barrel for selectively controlling the flow of the fluid into the at least one inlet of the barrel. Additionally, the valve assembly includes an actuator assembly operably coupled to the sleeve and configured to rotate the sleeve between a first position and a second position.

20 Claims, 11 Drawing Sheets

(51) Int. Cl.
*F01P 7/16* (2006.01)
*F04D 29/58* (2006.01)
*F16K 31/528* (2006.01)
*F16K 31/53* (2006.01)
*F16K 5/04* (2006.01)
*F16K 5/12* (2006.01)
*F16K 11/085* (2006.01)
*F16K 31/04* (2006.01)
*F01P 7/14* (2006.01)

(52) U.S. Cl.
CPC ........ *F04D 29/5806* (2013.01); *F16K 5/0471* (2013.01); *F16K 5/12* (2013.01); *F16K 11/0856* (2013.01); *F16K 31/041* (2013.01); *F16K 31/528* (2013.01); *F16K 31/535* (2013.01); *F01P 2007/146* (2013.01); *F01P 2025/44* (2013.01)

(56) References Cited

U.S. PATENT DOCUMENTS

| | | | |
|---|---|---|---|
| 9,115,634 B2 | 8/2015 | Triebe et al. | |
| 2011/0259287 A1* | 10/2011 | Kakehashi | F01P 7/164 123/41.09 |
| 2013/0333863 A1* | 12/2013 | Pawellek | F01P 5/12 165/104.19 |
| 2014/0174873 A1* | 6/2014 | Qin | F16D 13/38 192/66.32 |
| 2016/0017894 A1 | 1/2016 | Qin et al. | |
| 2016/0040676 A1* | 2/2016 | Roby | F16D 27/11 417/15 |
| 2016/0061092 A1* | 3/2016 | Sprygada | F04D 13/024 123/41.08 |
| 2016/0258340 A1* | 9/2016 | Klippert | F01P 5/10 |
| 2016/0319831 A1* | 11/2016 | Furusawa | F04D 29/043 |

* cited by examiner

VALVE ASSEMBLY INTEGRATED INTO A COOLANT PUMP AND METHOD FOR CONTROLLING THE SAME

RELATED APPLICATIONS

This application claims priority to and the benefit of U.S. Provisional Patent Application No. 62/435,360, filed on Dec. 16, 2016, the entire contents of which are hereby incorporated by reference.

BACKGROUND OF THE INVENTION

1. Field of the Invention

The subject invention generally relates to a clutch control system which includes a valve assembly for controlling a fluid and a control method for controlling the valve assembly.

2. Description of the Related Art

Conventional vehicles include an engine having a fluid flowing within the engine. During vehicle operation, the fluid becomes hot which can lead to overheating of the engine. Similarly, other portions of the vehicle include fluid which may have its temperature rise to an undesirable temperature during vehicle operation. To prevent overheating, conventional vehicles include a coolant pump or water pump which routes the fluid to a cooling circuit which cools down the fluid coming from the engine and/or other sources.

The coolant pump may have multiple inlets from various locations within the vehicle. In some conventional vehicles, the flow into the coolant pump is not controlled at all. In other conventional vehicles, each of these inlets may be coupled to a separate control valve which will control the flow to each individual inlet. Allowing constant flow into the coolant pump or having separate control valves for each individual inlet may lead to inaccurate fluid flow, high pressure loss, and pump inefficiencies. As such, there remains a need for improved fluid flow which is faster and more accurate, along with the addition of zero flow capabilities and less pressure loss. Additionally, the need for improved pump efficiencies which lead to improved engine performance and fuel economy of the vehicle remains.

SUMMARY OF THE INVENTION AND ADVANTAGES

A pump assembly is disclosed which is fluidly coupled to a vehicle engine for cooling a fluid. The pump assembly includes a pump housing defining an outlet and an impeller disposed in the pump housing for moving the fluid in the pump housing towards the outlet. Additionally, the pump assembly includes a valve assembly integrated with the pump housing. The valve assembly includes a barrel disposed in the pump housing and having at least one inlet, wherein the at least one inlet is configured to provide controlled flow of the fluid into the pump housing. A sleeve is disposed in the barrel and is also rotatably coupled to the barrel for selectively controlling the flow of the fluid into the at least one inlet of the barrel. Moreover, the sleeve is configured to rotate between a first position and a second position. Additionally, the valve assembly includes an actuator assembly operably coupled to the sleeve and configured to rotate the sleeve between the first position and the second position. The valve assembly also includes an adaptor seal disposed about the barrel for preventing leakage of the fluid between the barrel and the pump housing. Finally, the pump assembly include at least one inlet seal which is configured to prevent leakage between the sleeve and the barrel.

A vehicle assembly includes a vehicle engine and a pump assembly which is fluidly coupled to a vehicle engine for moving a fluid. The pump assembly includes a pump housing defining an outlet and an impeller disposed in the pump housing for moving the fluid in the pump housing towards the outlet. Additionally, the pump assembly includes a valve assembly integrated with the pump housing. The valve assembly includes a barrel disposed in the pump housing and having at least one inlet, wherein the at least one inlet is configured to provide controlled flow of the fluid into the pump housing. A sleeve is disposed in the barrel and is also rotatably coupled to the barrel for selectively controlling the flow of the fluid into the at least one inlet of the barrel. Moreover, the sleeve is configured to rotate between a first position and a second position. Additionally, the valve assembly includes an actuator assembly operably coupled to the sleeve and configured to rotate the sleeve between the first position and the second position. Finally, the valve assembly includes an adaptor seal disposed about the barrel for preventing leakage of the fluid between the barrel and the pump housing.

The configuration described herein of integrating the valve assembly with the pump housing allows the capability of three-zone coolant pump control such as mechanical, zero flow, and reduced flow conditions. Additionally, the configuration also allows the benefit of fast and accurate fluid flow control, low pressure loss, and zero flow capabilities. This leads to improved pump efficiency, improved vehicle engine performance, and increased fuel economy benefit.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
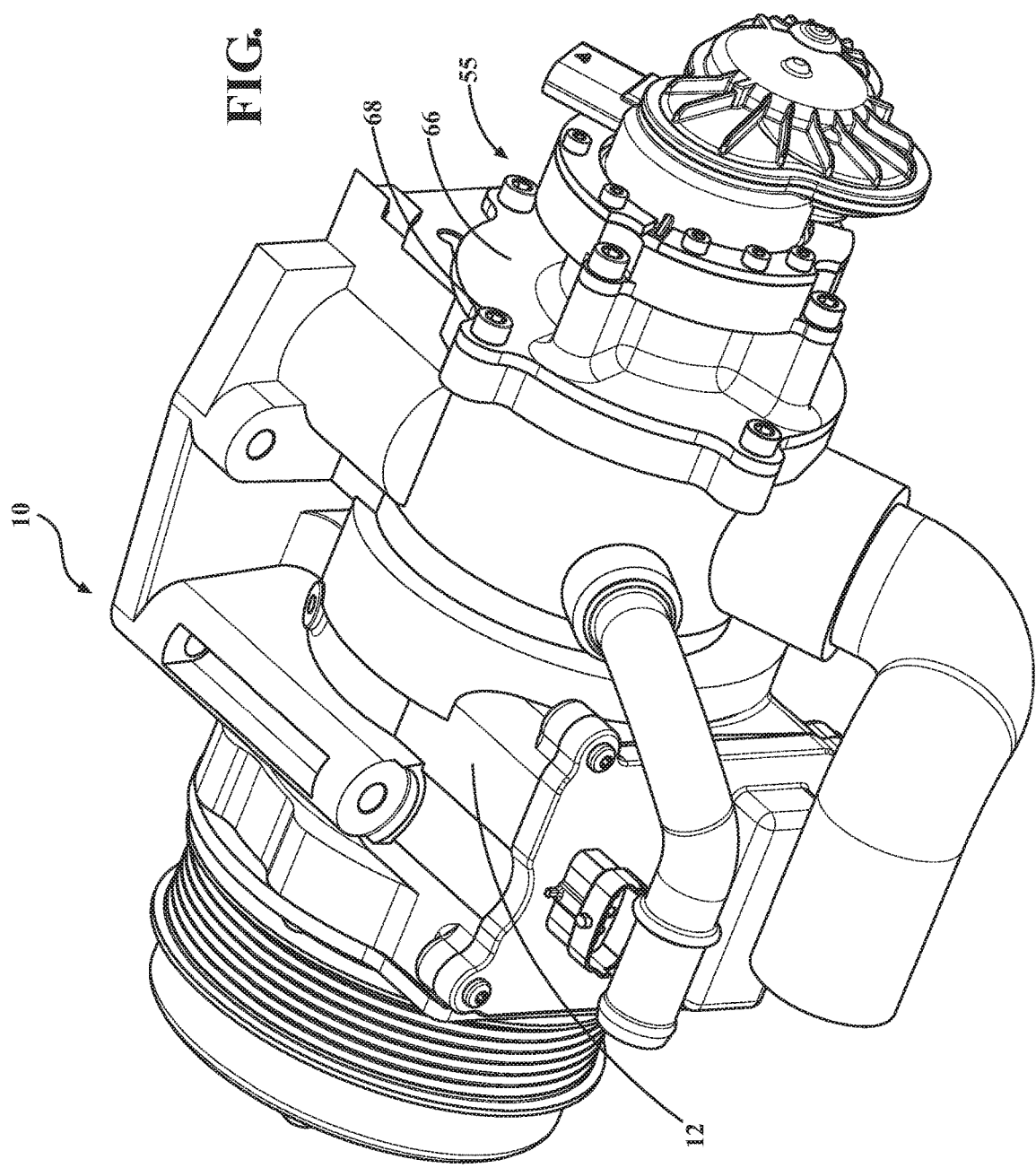
FIG. 1 is a perspective view of a pump assembly.

With reference to the Figures, wherein like numerals indicate like parts throughout the several views, a pump assembly 10 is generally shown in FIG. 1. The pump assembly 10 may be disposed in any type of vehicle such as a standard car, truck, semi-truck, ATV, or the like without departing from the spirit of the invention. Moreover, the pump assembly 10 is fluidly coupled to various portions of the vehicle, including but not limited to an engine, a transmission, a radiator, a coolant reservoir, a heater core, and an exhaust gas recirculation (EGR) system. Typically, power of the pump assembly 10 is tied to the main power of the vehicle, such that when the vehicle is off, the pump assembly 10 is not operating and when the vehicle is turned on, the pump assembly 10 operates. However, it is also contemplated that the pump assembly 10 may be activated or powered by another means as known by one of ordinary skill in the art such that the pump assembly 10 may still operate in at least some capacity even when the vehicle is off.

The pump assembly 10 includes a pump housing 12. The pump housing 12 may be of any shape and size as desired by one of ordinary skill in the art to allow ease of installation into the vehicle. Additionally, the pump housing 12 may be comprised of any material as known by one of ordinary skill in the art including but not limited to steel or other metal, a steel alloy, aluminum, a plastic polymer, or the like. The pump housing 12 defines a plurality of ports for allowing fluid to move from various portions of the vehicle and an outlet for allowing fluid to leave the pump housing 12.

There may be any number of ports including but not limited to the examples shown in FIGS. 10-13 which show four (FIGS. 10-11) or five (FIGS. 12-13) ports. For example, in the embodiment illustrated in FIGS. 10-11, the ports of the pump housing 12 may include a hot bottle port 14 for fluid which comes from the coolant reservoir, an EGR port 16 for fluid which comes from the exhaust gas recirculation system, a bypass port 18 for fluid which comes from the vehicle engine, and a radiator port 20 for fluid which comes from the vehicle radiator. However, it is contemplated that the ports may be any other ports as known by one of ordinary skill in the art. Moreover, the pump housing 12 may include more or less ports of any type known by one of ordinary skill in the art. Additionally, in the embodiment illustrated in FIGS. 12-13, the ports may include the hot bottle port 14 for fluid which comes from the coolant reservoir, the EGR port 16 for fluid which comes from the exhaust gas recirculation system, the bypass port 18 for fluid which comes from the vehicle engine, the radiator port 20 for fluid which comes from the vehicle radiator, and a heater core port 22 for fluid which comes from the heater core. Again, it is contemplated that the pump housing 12 may include any other port as known by one of ordinary skill in the art. Moreover, the pump housing 12 may include more or less ports of any type known by one of ordinary skill in the art.

Figure 3:
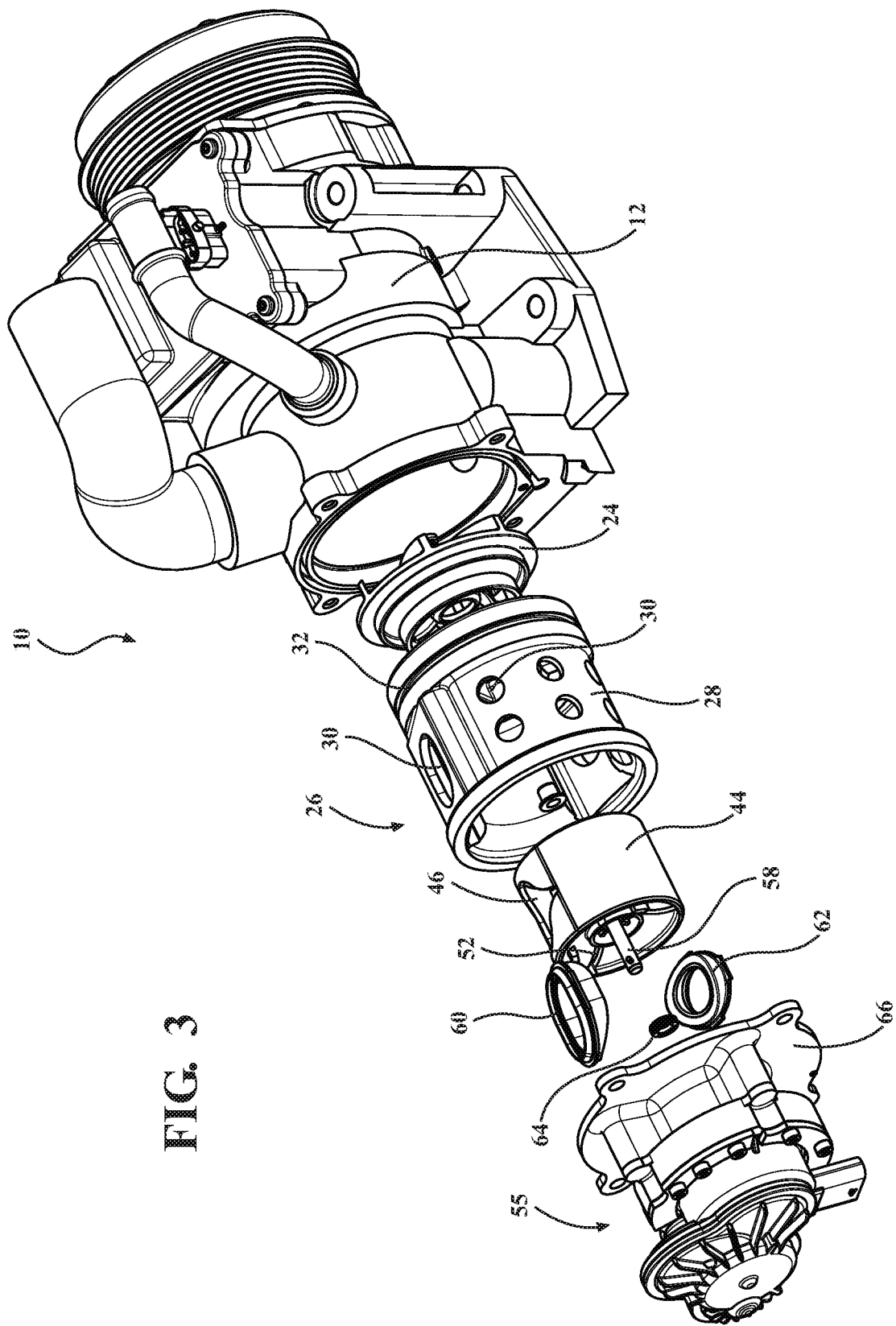
FIG. 3 is an exploded view of the pump assembly.

As illustrated in FIG. 3, the pump assembly 10 includes an impeller 24. Generally, the impeller 24 is completely disposed within the pump housing 12. However, it is also contemplated that at least a portion of the impeller 24 may be disposed outside of the pump housing 12. When the pump assembly 10 is activated, the impeller 24 is configured to rotate in order to move the fluid through the pump housing 12 and toward an outlet of the pump housing 12. The impeller 24 may be comprised of steel or other metal, a metal alloy, a plastic polymer, aluminum or the like. Additionally, the impeller 24 may be a standard impeller 24 and define an inlet and include multiple vanes for moving the fluid and may include various other features as known by one of ordinary skill in the art. The pump housing 12 and the impeller 24 comprise a coolant pump. The coolant pump may be a dual mode coolant pump or any other coolant pump as known by one of ordinary skill in the art, including but not limited to a mechanical coolant pump or an electrical coolant pump. The coolant pump may also be known as a water pump.

Figure 2:
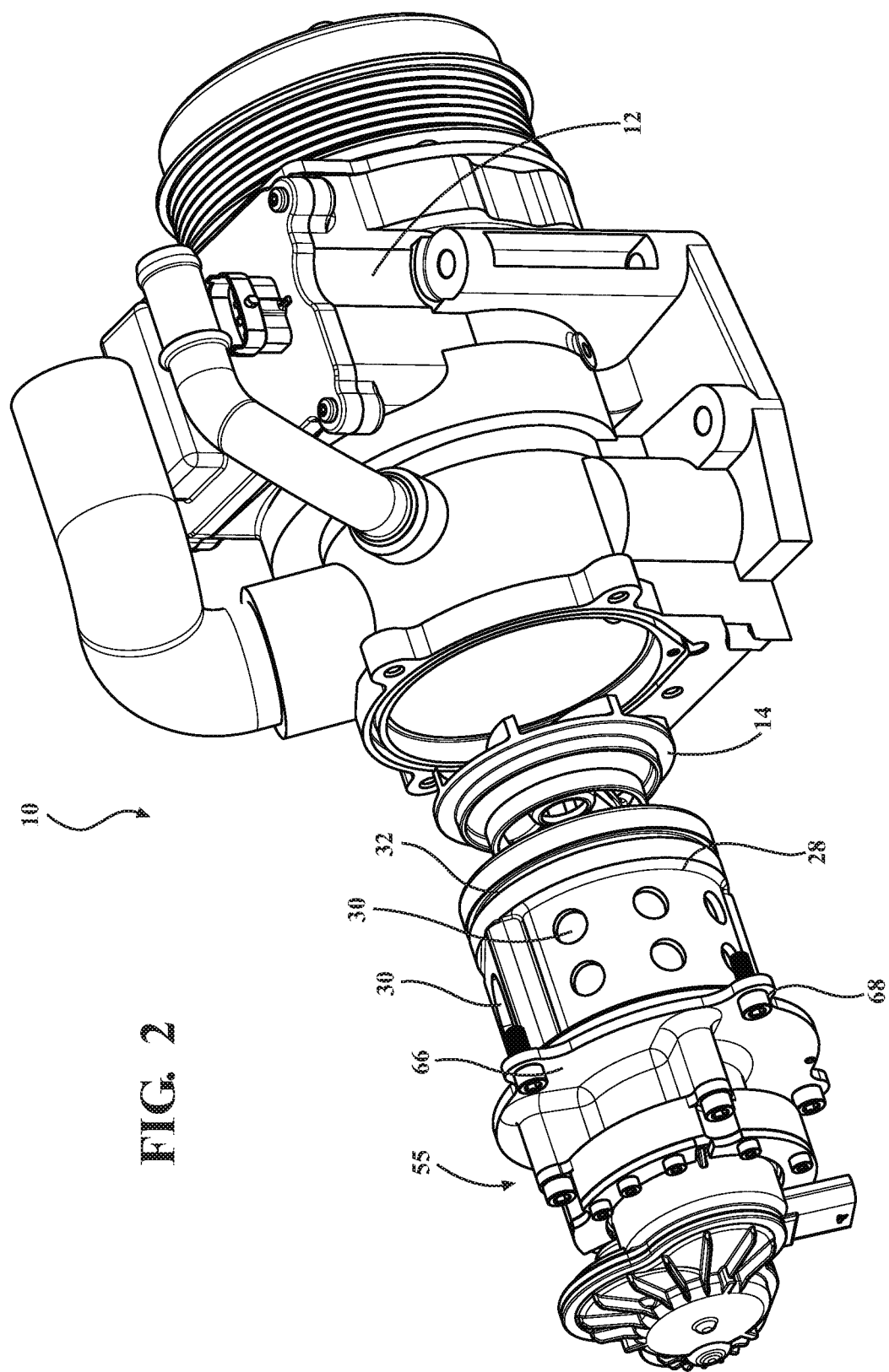
FIG. 2 is a partially exploded view of the pump assembly having a pump housing and a valve assembly.
Figure 4:
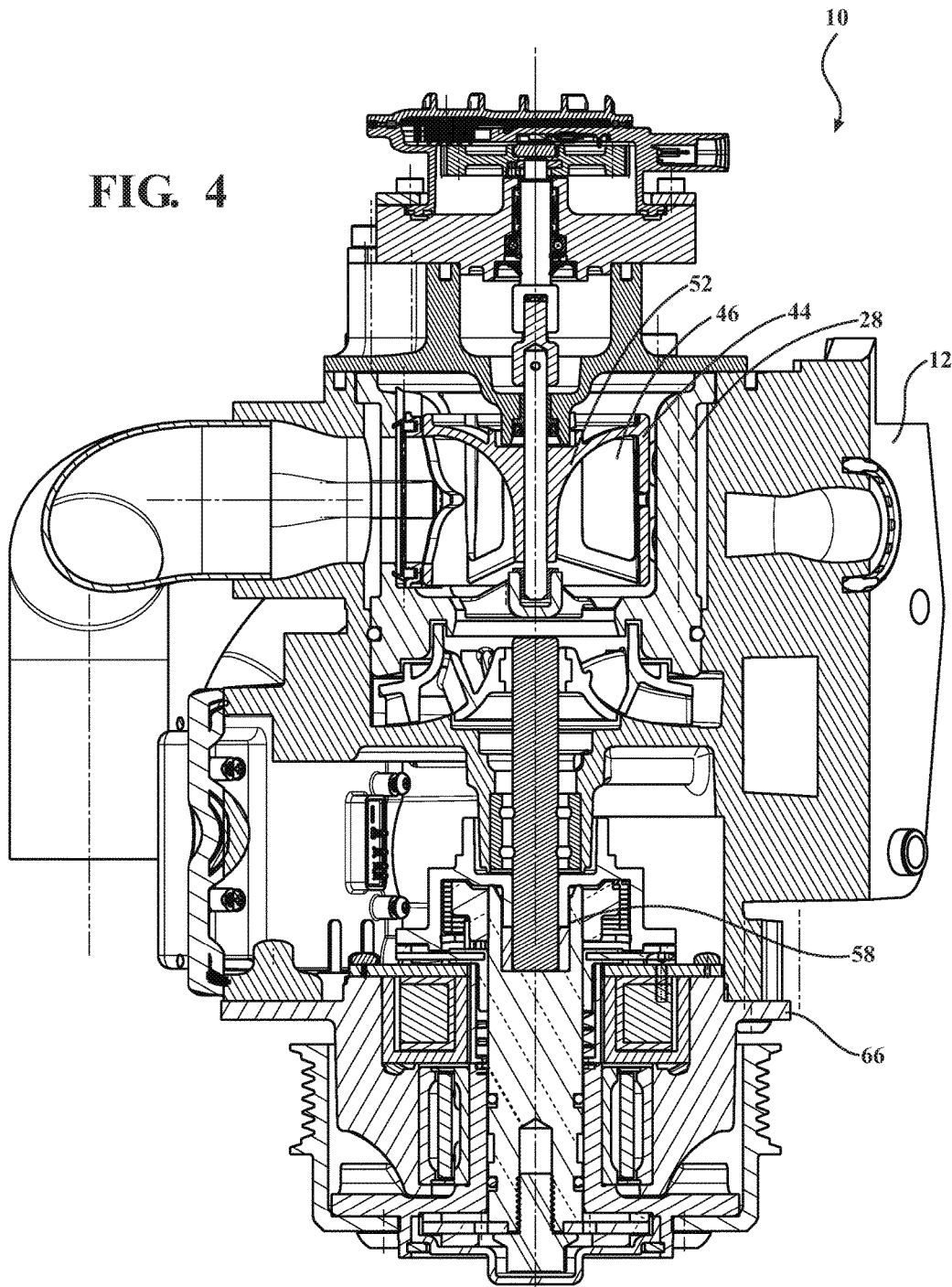
FIG. 4 is a cross sectional view of the pump assembly.
Figure 5:
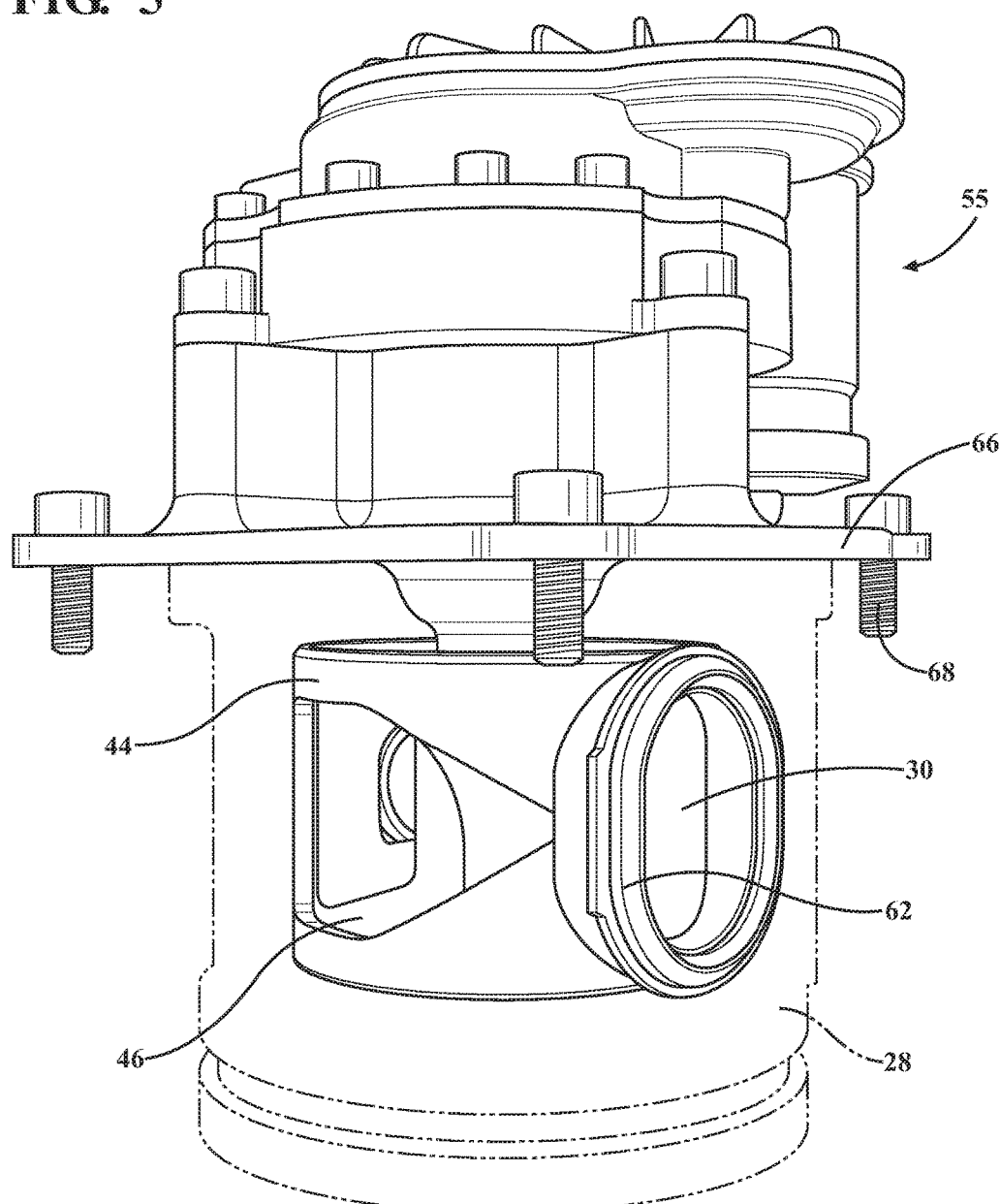
FIG. 5 is a perspective view of the valve assembly.
Figure 6:
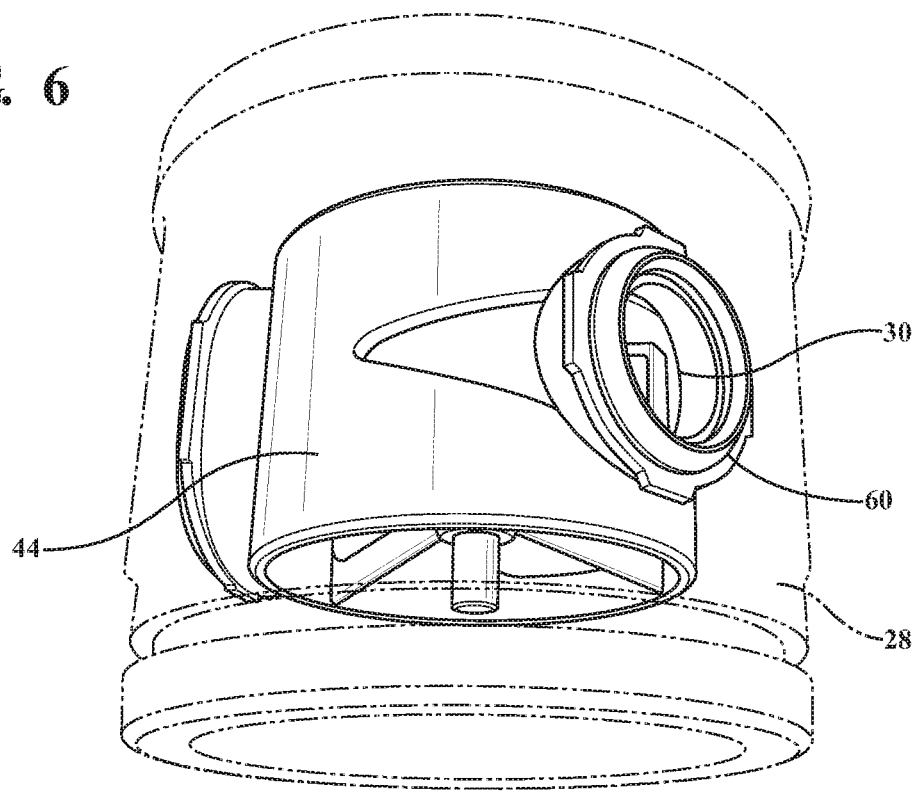
FIG. 6 is a perspective view of a sleeve of the valve assembly.

Moreover, as illustrated in FIGS. 2-4, the pump assembly 10 also includes a valve assembly 26. The valve assembly 26 may comprise an electronic control valve, however, it is also contemplated that the valve assembly 26 may comprise any type of valve as known by one of ordinary skill in the art including but not limited to a hydraulic valve, a pneumatic valve, a manual valve, a wax actuated valve, or a solenoid valve. As best illustrated in FIGS. 1 and 4, the valve assembly 26 is integrated with the pump housing 12. It is also contemplated that the valve assembly 26 may be disposed on another portion of the vehicle, including but not limited to fixed to the outside of the coolant pump or the engine.

The valve assembly 26 includes a barrel 28. As best illustrated in FIGS. 3-6, the barrel 28 is disposed in the pump housing 12. In the embodiment shown in the Figures, the barrel 28 is generally cylindrical and defines at least one inlet 30. Additionally, it is contemplated that the barrel 28 may be any size or shape which is allows the barrel 28 to be placed inside of the pump housing 12. Also, the barrel 28 may include more than one inlet aperture for some or all of the fluid inlets 30. Moreover, the barrel 28 is configured to be fluidly coupled to the impeller 24. During operation, the impeller 24 will move the fluid through the inlets 30 and towards the outlet of the pump housing 12.

As best illustrated in FIG. 3, the barrel 28 includes an adaptor seal 32. The adaptor seal 32 is disposed about the circumference of barrel 28 and is configured to prevent leakage of the fluid between the barrel 28 and the pump housing 12. In other words, the adaptor seal 32 is configured to provide a fluid tight seal between the barrel 28 and the pump housing 12. It is also contemplated that the adaptor seal 32 may also be configured to provide a fluid tight seal between the barrel 28 and the impeller 24. As shown in FIG. 3, the adaptor seal 32 extends around the entire circumference of the barrel 28 and is placed towards the end located towards the pump housing 12 in the exploded view of FIG. 3. However, it is also contemplated that the adaptor seal 32 may be placed at another location on the barrel 28.

As illustrated in FIGS. 10-13, the barrel 28 may include a plurality of inlets 30. Each of the ports of the pump housing 12, as described above correspond to at least one of the inlets 30. For example, in the embodiment illustrated in FIGS. 10-11, the inlets 30 of the barrel 28 may include a hot bottle inlet 34 for inletting fluid from the hot bottle port 14 which comes from the coolant reservoir, an EGR inlet 36 for inletting fluid from the EGR port 16 which comes from the exhaust gas recirculation system, a bypass inlet 38 for inletting fluid from the bypass port 18 which comes from the vehicle engine, and a radiator inlet 40 for inletting fluid from the radiator port 20 which comes from the vehicle radiator. However, it is contemplated that the inlets 30 may be any other inlets as known by one of ordinary skill in the art. Moreover, the barrel 28 may include more or less inlets 30 of any type known by one of ordinary skill in the art. Additionally, in the embodiment illustrated in FIGS. 12-13, the inlets 30 may include the hot bottle inlet 34 for inletting fluid from the hot bottle port 14 which comes from the coolant reservoir, the EGR inlet 36 for inletting fluid from the EGR port 16 which comes from the exhaust gas recirculation system, the bypass inlet 38 for inletting fluid from the bypass port 18 which comes from the vehicle engine, the radiator inlet 40 for inletting fluid from the radiator port 20 which comes from the vehicle radiator, and a heater core inlet 42 for inletting fluid from the heater core port 22 which comes from the heater core. Again, it is contemplated that the barrel 28 may include any other inlet or further include any other inlets as known by one of ordinary skill in the art. Moreover, the barrel 28 may include more or less inlets 30 of any type known by one of ordinary skill in the art.

At least one of the ports is configured to provide controlled flow of the fluid into the pump housing 12. In the embodiment illustrated in FIGS. 10-11, there are two controlled ports while the other two ports are uncontrolled. In this embodiment, the radiator port 20 and the bypass port 18 are controlled ports while the other two ports are uncontrolled ports. In the embodiment illustrated in FIGS. 12-13, there are again two controlled ports while the other three ports are uncontrolled ports. Again, in the embodiment illustrated in FIGS. 12-13, the radiator port 20 and the bypass port 18 are controlled ports while the other three ports are uncontrolled ports. However, it is contemplated that there may be more or less than two controlled ports. It is also contemplated that any of the other ports including but not limited to the hot bottle port 14, the heater core port 22 and the EGR port 16 may be controlled ports. The controlled ports are configured to be controlled such that the valve assembly 26 can control the flow into the pump housing 12 using a rotatable sleeve 44. The uncontrolled ports are completely open such that the inlets 30 of the barrel 28 and apertures 46 of the sleeve 44 are aligned to allow the fluid to flow freely into the pump housing 12 without interference. The controlled ports are controlled such that the inlets 30 of the barrel 28 and, in turn, the port of the pump housing 12 are at least partially obstructing the flow of fluid into the pump housing 12. In other words, when the port is fully open, the port of the pump housing 12, the inlet 30 of the barrel 28, and the apertures 46 of the sleeve 44 are aligned such that no obstruction of the fluid flow occurs. When the port is closed, the port of the pump housing 12, the inlet 30 of the barrel 28, and the circumference of the sleeve 44 are aligned such that no fluid flow occurs. It is also contemplated that the port of the pump housing 12, the inlet 30 of the barrel 28, and the aperture 46 of the sleeve 44 may be aligned to allow partial flow into the pump housing 12. The controlled ports can therefore allow flow to vary from closed to fully open and anywhere there between.

The controlled inlets, in the embodiments shown in FIGS. 10-13, the bypass port 18 and the radiator port 20, are disposed between approximately 30 degrees and 180 degrees and usually between approximately 130 degrees and 160 degrees away from one another about the barrel 28. In one embodiment, the two controlled ports are disposed approximately 148 degrees from each other to provide optimum inlet flow. However, it is also contemplated that the controlled inlets may be disposed about the barrel 28 according to any angle as desired by one of ordinary skill in the art.

As stated above and as illustrated in the Figures, the valve assembly 26 uses the sleeve 44 to control the ports. The sleeve 44 is disposed in and rotatably coupled to the barrel 28. The sleeve 44 is configured to selectively control the flow of the fluid into the inputs of the barrel 28. Moreover, the sleeve 44 is configured to rotate between a first position 48 and a second position 50. In the embodiments illustrated in FIGS. 10-13, when the sleeve 44 is in the first position 48 the radiator port 20 is open and the bypass port 18 is closed. Additionally, when the sleeve 44 is in the second position 50 the radiator port 20 is closed and the bypass port 18 is open. It is also contemplated that the sleeve 44 may be disposed anywhere between the first position 48 and the second position 50 such that both the radiator port 20 and the bypass port 18 are partially open. Moreover, it is contemplated that the sleeve 44 may be configured to control more or fewer of the inlets 30, as desired by one of ordinary skill in the art.

Figure 7:
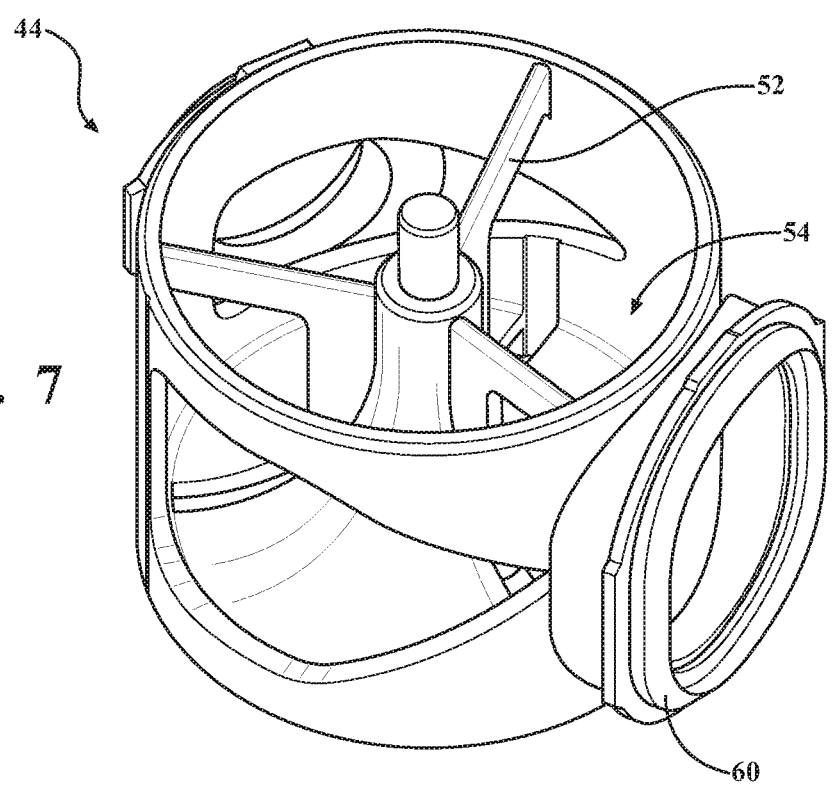
FIG. 7 is a perspective view of the sleeve of the valve assembly.
Figure 8:
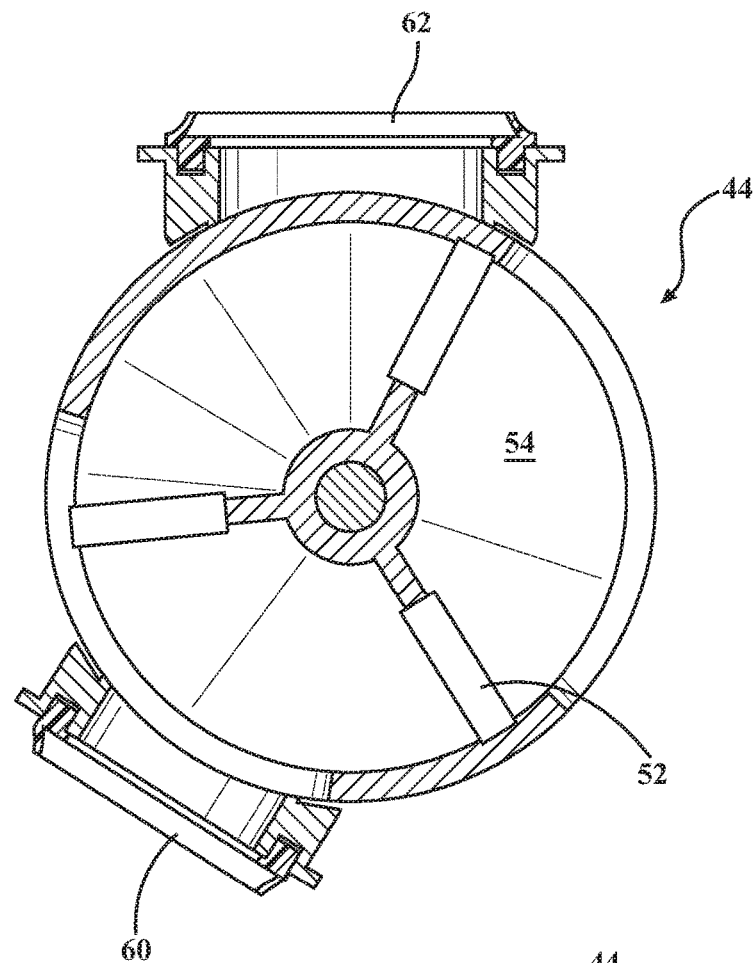
FIG. 8 is a top view of the sleeve of the valve assembly.
Figure 9:
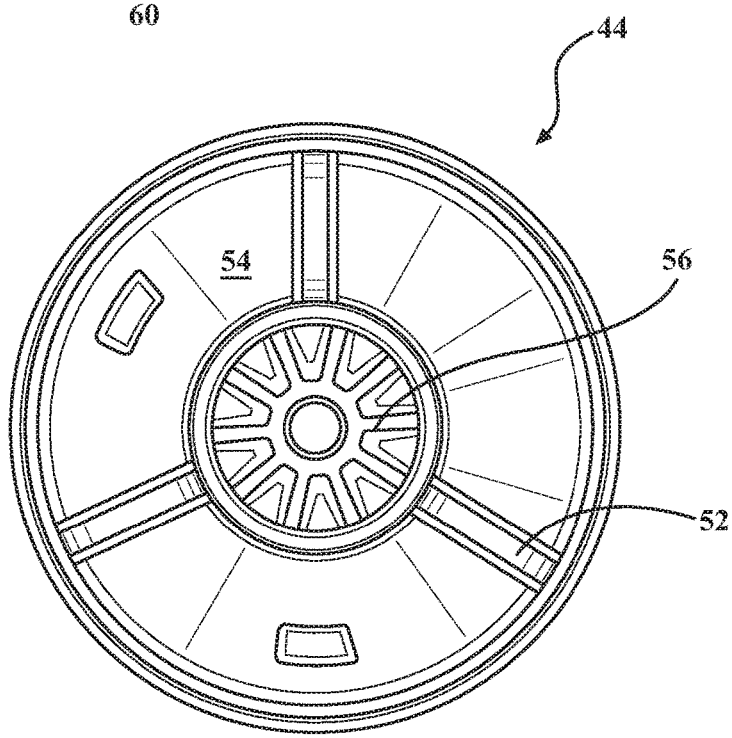
FIG. 9 is a bottom view of the sleeve of the valve assembly.
Figure 10:
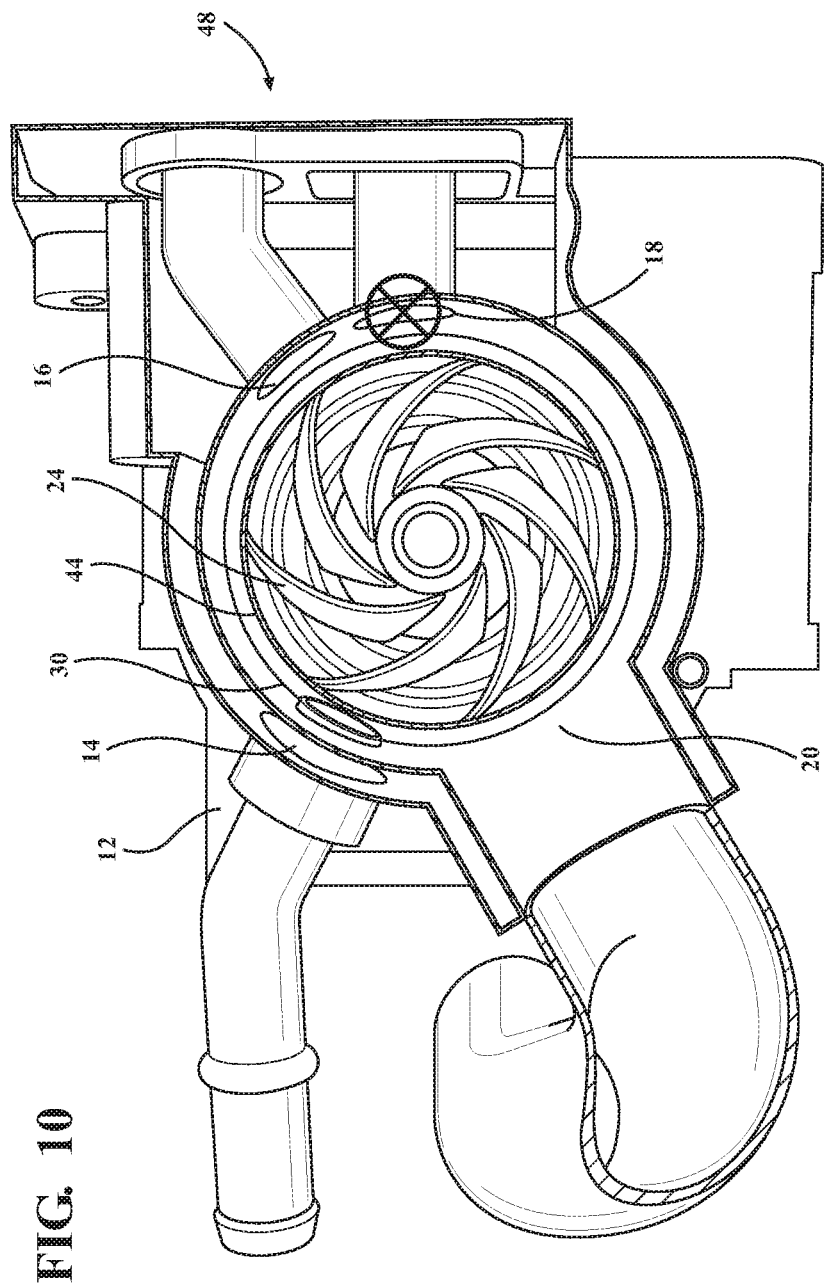
FIG. 10 is a schematic top view of the pump assembly having the sleeve in a first position.
Figure 11:
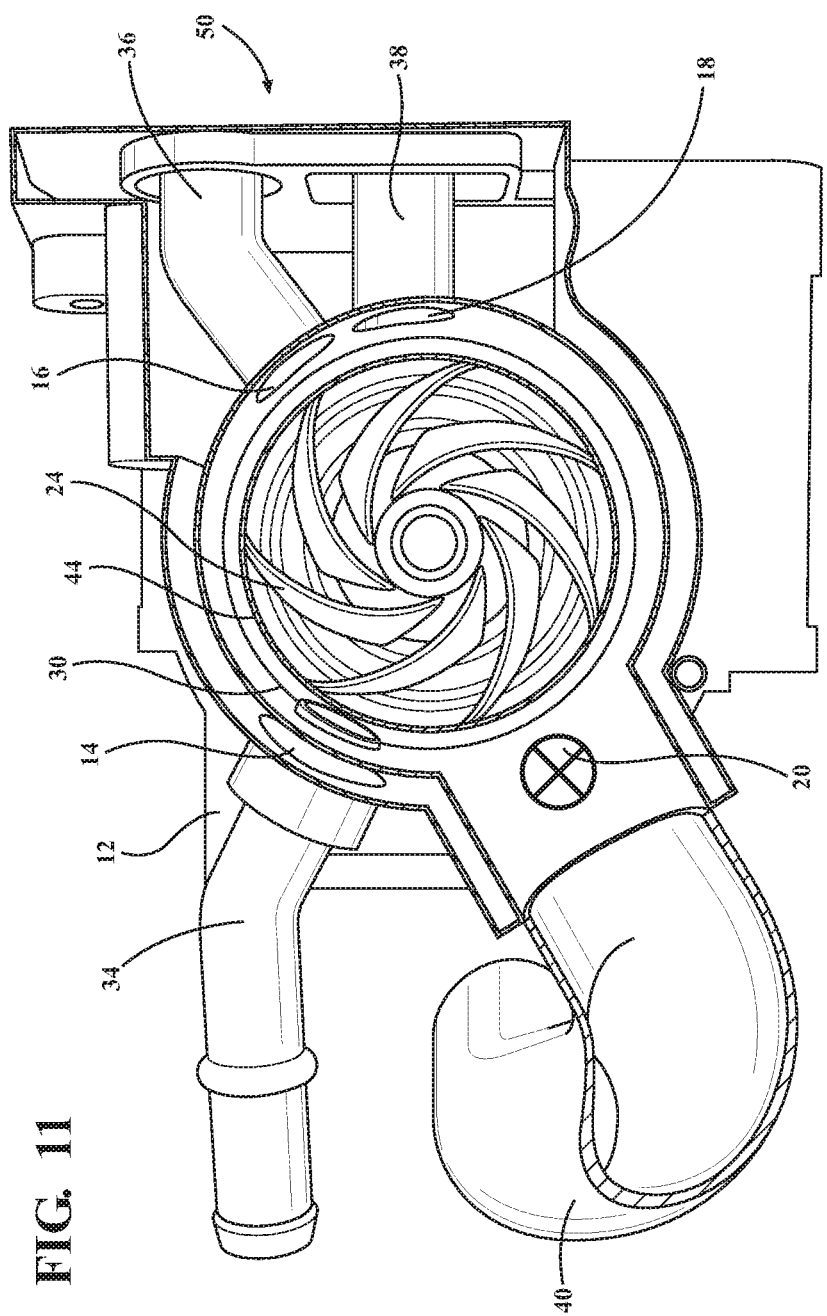
FIG. 11 is a top view of the pump assembly having the sleeve in a second position.
Figure 12:
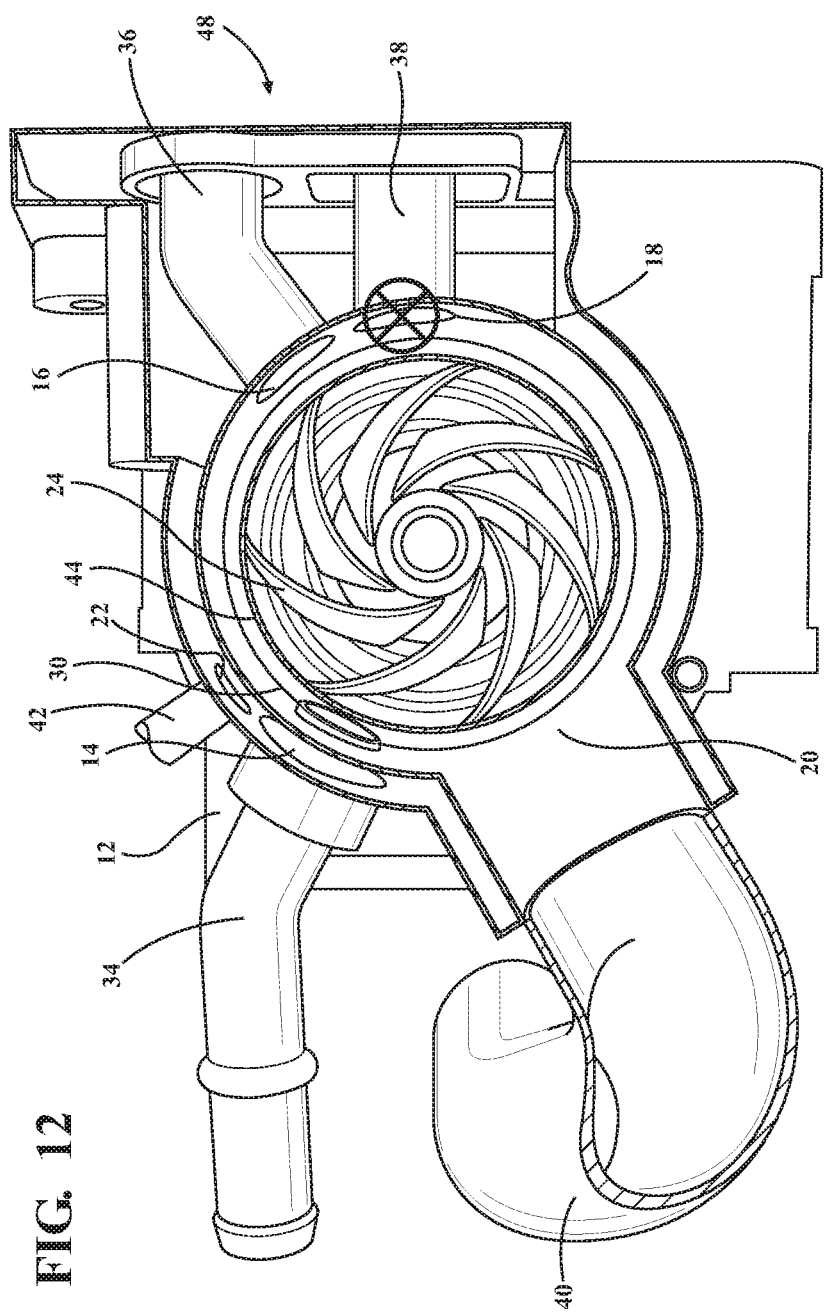
FIG. 12 is a schematic top view of a second embodiment of the pump assembly having the sleeve in a first position.
Figure 13:
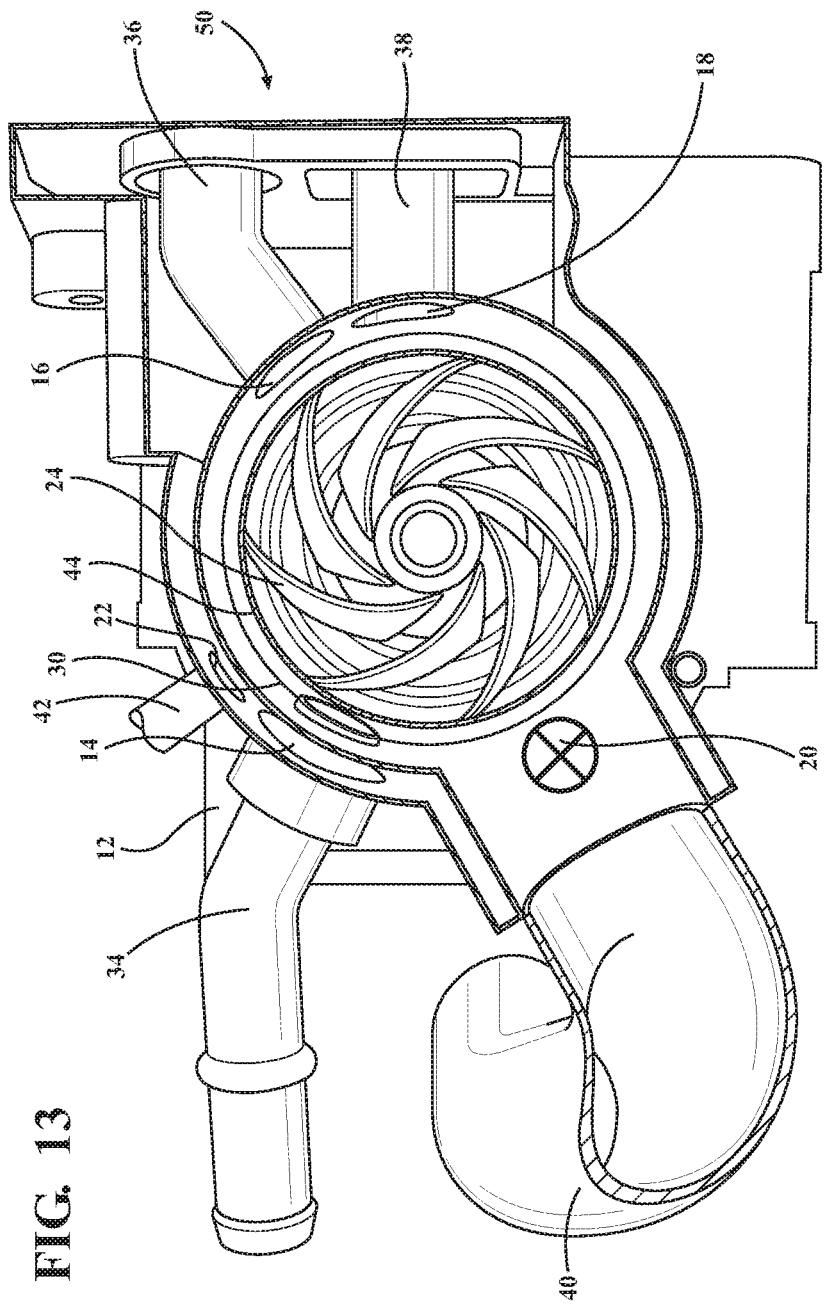
FIG. 13 is a top view of the second embodiment of the pump assembly having the sleeve in a second position.

As best illustrated in FIGS. 7-9, the sleeve 44 is generally cylindrical. The sleeve 44 includes at least one, and typically a plurality of, apertures 46 disposed about the circumference of the sleeve 44. The apertures 46 are configured to align with one or more of the inlets 30 of the barrel 28. Additionally, the sleeve 44 is generally comprised of a plastic polymer but also may be comprised of any metal, metal alloy, aluminum, steel or steel alloy, or other material as known by one of ordinary skill in the art. Moreover, the sleeve 44 may be of any shape and size which is configured to be disposed in the barrel 28. The sleeve 44 also includes an inner structure 52 which may be configured to divide the interior of the sleeve 44 into various compartments 54. In the embodiment illustrated in FIGS. 7-9, the inner structure 52 divides the inside of the sleeve 44 into three compartments 54 of equal size. However, the inner structure 52 may divide the inside of the sleeve 44 into any number of compartments of any size. Moreover, the inner structure 52 may include through holes such that the various compartments 54 may be fluidly coupled to one another.

Additionally, the valve assembly 26 includes an actuator assembly 55. The actuator assembly 55 is operably coupled to the sleeve 44. Moreover, the actuator assembly 55 is configured to rotate the sleeve 44 between the first position 48 and the second position 50. It is contemplated that the actuator assembly 55 may be a standard actuator assembly as known by one of ordinary skill in the art. It is also contemplated that actuator assembly 55 may be a hydraulic, pneumatic, electric, thermal or mechanical actuator assembly. Moreover, the actuator assembly 55 is configured to receive a signal from a controller which determines the desired position of the sleeve 44.

As best illustrated in FIG. 9, the actuator assembly 55 may also include a gear assembly 56 that is configured to allow the sleeve 44 to rotate within the barrel 28. Moreover, the actuator assembly 55 may include an actuator shaft 58 which is configured to be coupled with the gear assembly 56 in order to rotate the sleeve 44 within the barrel 28 between the first position 48 and the second position 50. It is also contemplated that the sleeve 44 may be rotated by another mechanism as known by one of ordinary skill in the art. It is contemplated that, the actuator shaft 58 may extend completely through the sleeve 44. However, it is also contemplated that the actuator shaft 58 may be coupled to a separate bushing and pin assembly which extends through the sleeve 44. Moreover, it is additionally contemplated that the actuator shaft 58 may be coupled to another mechanism as known by one of ordinary skill in the art which is configured to rotate the sleeve 44.

Moreover, the valve assembly 26 also includes at least one inlet seal. In the embodiment illustrated in FIG. 3, the valve assembly 26 includes two inlet seals. However, it is contemplated that the valve assembly 26 may include more or fewer inlet seals as desired by one of ordinary skill in the art. The inlet seals are configured to prevent fluid leaks when the sleeve 44 is in the first position 48, in the second position 50, or anywhere there between. In the embodiment illustrated in FIG. 3, the two inlet seals are a radiator seal 60 which is configured to be disposed at the radiator port 20 and a bypass seal 62 which is configured to be disposed at the bypass port 18. The inlet seals may be comprised of rubber or any other material as known by one of ordinary skill in the art. Additionally, the valve assembly 26 may also include an actuator shaft seal 64 disposed about the actuator shaft 58. The actuator shaft seal 64 may additionally be configured to couple the actuator shaft 58 and the actuator assembly 55.

Additionally, as illustrated in the Figures, the actuator assembly 55 includes an adaptor plate 66 for engaging the actuator assembly 55 to the pump housing 12. The actuator assembly 55 and the pump housing 12 may be coupled or engaged with one another using at least one fixing mechanism 68. The actuator assembly 55 may act as a cover which encloses the pump housing 12 with the remainder of the valve assembly 26 including the barrel 28 and the sleeve 44 in the pump housing 12. However, it is also contemplated that the pump assembly 10 includes a separate cover which completely encloses the valve assembly 26 within the pump housing 12.

As illustrated in the Figures and as described above, the valve assembly 26 is integrated with the pump housing 12. More specifically, the valve assembly 26 is at least partially disposed within the pump housing 12. As illustrated in FIGS. 1 and 4, the barrel 28 and sleeve 44 of the valve assembly 26 are completely disposed within the pump housing 12 such that neither the barrel 28 nor the sleeve 44 are visible from outside of the pump housing 12. In other words, the valve assembly 26 is nested inside of the pump housing 12 such that the barrel 28 is disposed inside of the pump housing 12 and, as described above, the sleeve 44 is disposed within the barrel 28. As such, both the barrel 28 and the sleeve 44 are enclosed within the pump housing 12. Moreover, the pump assembly 10 may include the cover and the valve assembly 26 may be disposed between the lid and the pump housing 12.

During installation, the sleeve 44 is placed into the barrel 28 and the barrel 28/sleeve 44 combination is fluidly coupled with the impeller 24 and disposed within the pump housing 12. As illustrated in FIG. 3, when installed, an axis disposed through the sleeve 44 is parallel to an axis disposed through the impeller 24. The actuator assembly 55 is coupled to the barrel 28 and fixed to the pump housing 12, forming the pump assembly 10. In operation, and as illustrated in at least FIGS. 10-13, when the pump assembly 10 is activated, the impeller 24 rotates causing fluid to be moved through the inlets 30. The sleeve 44 can begin in any position such as the first position 48, the second position 50, or anywhere there between. When desired, the sleeve 44 can be rotated by the actuator assembly 55 to control the flow of the controlled inputs. The actuator assembly 55 may be coupled to a controller which calculates or reads various parameters in order to determine the ideal position for the sleeve 44. The various parameters may include, but are not limited to, a pressure in any of the inlets, a fluid flow rate at any of the inlets, impeller 24 speed, a temperature at any location in the vehicle engine, a position in an engine performance map, or other parameters as known by one of ordinary skill in the art. In the embodiment shown in the Figures, the sleeve 44 is in the first position 48 when the radiator port 20 is open and the bypass port 18 is closed. The sleeve 44 can then be moved to the second position 50 by the actuator engaging the actuator shaft 58 and the gear assembly 56 to rotate the sleeve 44. The sleeve 44 is in the second position 50 when the radiator port 20 is closed and the bypass port 18 is open. The sleeve 44 may also be moved to any position between the first position 48 and the second position 50 where both the radiator port 20 and the bypass port 18 are partially open to varying degrees based on the position of the sleeve 44.

Integrating the valve assembly 26 with the pump housing 12 allows the capability of three-zone coolant pump control such as mechanical, zero flow, and reduced flow conditions. Additionally, this also allows the benefit of fast and accurate fluid flow control, low pressure loss, and zero flow capabilities. Therefore, integrating the valve assembly 26 with the pump housing 12 leads to improved pump efficiency, improved vehicle engine performance, and increased fuel economy benefit. The integration of the vale assembly 26 with the pump housing 12 may also help serviceability. The valve assembly may be replaced without replacing the entire pump assembly 10. This configuration also allows for improved vehicle integration, lower coolant volume in the pump assembly 10 and faster engine warm-up.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A pump assembly fluidly coupled to an engine of a vehicle for moving a fluid, said pump assembly comprising:
   a pump housing defining an outlet;
   an impeller disposed in said pump housing for moving the fluid in said pump housing towards said outlet; and
   a valve assembly integrated with said pump housing, said valve assembly comprising:
      a barrel disposed in said pump housing and defining at least one inlet configured to provide controlled flow of the fluid into said pump housing;
      a sleeve disposed in said barrel and rotatably coupled to said barrel for selectively controlling the flow of the fluid into said at least one inlet of said barrel, wherein said sleeve is configured to rotate between a first position and a second position;
      an actuator assembly operably coupled to said sleeve and configured to rotate said sleeve between said first position and said second position; and
      an adaptor seal disposed about said barrel for preventing leakage of the fluid between said barrel and said pump housing.

2. The pump assembly of claim 1, wherein said valve assembly is at least partially disposed in said pump housing.

3. The pump assembly of claim 2, wherein said pump housing defines a hot bottle port for inletting fluid from a coolant reservoir of the vehicle, an EGR port for inletting fluid from an exhaust gas recirculation system of the vehicle, a bypass port for inletting fluid from the engine of the vehicle, and a radiator port for inletting fluid from a radiator of the vehicle, and wherein each of said ports correspond to at least one of said plurality of inlets.

4. The pump assembly of claim 3, wherein at least two of said ports are controlled ports.

5. The pump assembly of claim 1, wherein said barrel and said sleeve are enclosed within said pump housing.

6. The pump assembly of claim 1, wherein said at least one inlet of said barrel comprises a plurality of inlets.

7. The pump assembly of claim 1, wherein said pump housing defines a hot bottle port for inletting fluid from a coolant reservoir of the vehicle, an EGR port for inletting fluid from an exhaust gas recirculation system of the vehicle, a bypass port for inletting fluid from the engine of the vehicle, a heater core port for inletting fluid from a heater core of the vehicle, and a radiator port for inletting fluid from a radiator of the vehicle, and wherein each of said ports correspond to at least one of said plurality of inlets.

8. The pump assembly of claim 7, wherein said sleeve is configured such that said radiator port and said bypass port are both controlled ports.

9. The pump assembly of claim 7, wherein when said sleeve is in said first position, said radiator port is open and said bypass port is closed.

10. The pump assembly of claim 9, wherein when said sleeve is in said second position, said radiator port is closed and said bypass port is open.

11. The pump assembly of claim 7, further comprising a radiator seal disposed at said radiator port for preventing leaks of the fluid when said sleeve is in said first position, in said second position, or therebetween.

12. The pump assembly of claim 7, further comprising a bypass seal disposed at said bypass port for preventing leaks of the fluid when said sleeve is in said first position, in said second position, or therebetween.

13. The pump assembly of claim 1, further comprising a cover for enclosing said valve assembly and an adaptor plate for engaging said valve assembly to said cover.

14. The pump assembly of claim 1, wherein said actuator assembly further comprises an actuator shaft configured to rotate said sleeve between said first position and said second position.

15. The pump assembly of claim 1, wherein said impeller and said pump housing comprise a dual mode coolant pump.

16. A cooling system comprising:
an engine;
a coolant reservoir;
an exhaust gas recirculation system;
a heater core;
a radiator;
a pump assembly fluidly coupled to said engine for moving a fluid, said pump assembly comprising:
a pump housing;
an impeller disposed in said pump housing for moving the fluid in said pump housing towards an outlet; and
a valve assembly integrated with said pump housing, said valve assembly comprising:
a barrel disposed in said pump housing and defining at least one inlet configured to provide controlled flow of the fluid into said pump housing;
a sleeve disposed in said barrel and rotatably coupled to said barrel for selectively controlling the flow of the fluid into the at least one inlet of said barrel, wherein said sleeve is configured to rotate between a first position and a second position;
an actuator assembly operably coupled to said sleeve and configured to rotate said sleeve between said first position and said second position; and
an adaptor seal disposed about said barrel for preventing leakage of the fluid between said barrel and said pump housing.

17. The cooling system of claim 16, wherein said valve assembly is at least partially disposed in said pump housing.

18. The cooling system of claim 16, wherein said barrel and said sleeve are enclosed within said pump housing.

19. The cooling system of claim 16, wherein said pump housing defines a hot bottle port for inletting fluid from said coolant reservoir, an EGR port for inletting fluid from said exhaust gas recirculation system, a bypass port for inletting fluid from said engine, a heater core port for inletting fluid from said heater core, and a radiator port for inletting fluid from said radiator.

20. The cooling system of claim 16, wherein at least two of said ports are controlled ports.

* * * * *